(12) United States Patent
Schober

(10) Patent No.: US 8,695,215 B2
(45) Date of Patent: Apr. 15, 2014

(54) METHOD FOR INSTALLING AN ASSEMBLY

(75) Inventor: Michael Schober, St. Valentin (AT)

(73) Assignee: Magna Powertrain AG & Co KG, Lannach (AT)

( * ) Notice: Subject to any disclaimer, the term of this patent is extended or adjusted under 35 U.S.C. 154(b) by 1045 days.

(21) Appl. No.: 12/430,183

(22) Filed: Apr. 27, 2009

(65) Prior Publication Data

US 2009/0272358 A1  Nov. 5, 2009

(30) Foreign Application Priority Data

Apr. 30, 2008  (DE) .................. 10 2008 021 682

(51) Int. Cl.
*B23P 11/02* (2006.01)

(52) U.S. Cl.
USPC ............. 29/888.01; 29/447; 403/273

(58) Field of Classification Search
USPC ............. 29/447, 446, 458, 505, 888.01, 29/888.012, 255; 123/192.2
See application file for complete search history.

(56) References Cited

U.S. PATENT DOCUMENTS

| | | | | |
|---|---|---|---|---|
| 3,136,129 A | * | 6/1964 | Lutze et al. ................ | 60/339 |
| 3,435,808 A | * | 4/1969 | Allender ................... | 123/232 |
| 4,476,614 A | * | 10/1984 | Pittroff ................... | 29/898.09 |
| 5,487,640 A | * | 1/1996 | Shaffer ................... | 415/119 |
| 2006/0115368 A1 | * | 6/2006 | Luedtke et al. ............ | 417/423.1 |
| 2008/0066312 A1 | * | 3/2008 | Donato ................... | 29/897.2 |

FOREIGN PATENT DOCUMENTS

DE  10 2005 049 705  4/2007

OTHER PUBLICATIONS

Roloff: H. et al., Maschinenelemente, Friedr. Vieweg & Sohn, Braunschweg, vol. 2, 1996, pp. 321-325.

* cited by examiner

*Primary Examiner* — Lee D Wilson
*Assistant Examiner* — Steven A Maynard
(74) *Attorney, Agent, or Firm* — Dickinson Wright PLLC

(57) ABSTRACT

The invention relates to a method for the assembly of a balance shaft unit for use in motor vehicles. The assembly includes a housing having a bearing section, a rotating component and at least one rolling element bearing for the axially fixed journaling of the rotating component in the bearing section of the housing. The rolling element bearing has a first ring section associated with the rotating component and a second ring section associated with the bearing section. First, the rolling element bearing is axially fixedly installed on the rotating component or in the bearing section. Next, the rotating component is cooled and/or the housing part is heated. Finally, the rotating component is introduced into the bearing section and is held until a temperature compensation has taken place between the rotating component and the housing such that a shrink-fit connection is established.

28 Claims, 3 Drawing Sheets

METHOD FOR INSTALLING AN ASSEMBLY

CROSS-REFERENCE TO RELATED APPLICATIONS

This application claims the benefit and priority of German patent Application No. 10 2008 021 162.8 filed Apr. 30, 2008. The entire disclosure of the above application is incorporated herein by reference.

FIELD

The present invention relates to a method for the installation of an assembly, in particular of a balance shaft unit for the compensation of mass or torque for internal combustion engines in motor vehicles.

BACKGROUND

This section provides background information related to the present disclosure which is not necessarily prior art.

Balance shafts have the purpose of compensating mass forces and mass torques arising in internal combustion engines. With specific engine types, for example with in-line engines having four cylinders, such balance shafts are used pair-wise, with the balance shafts rotating contrary-wise at double the crankshaft speed. The balance shafts as well as the components journaling them are subject to high load due to the high speed so that the stability of balance shaft units is of great importance.

Balance shaft units having a housing and such balance shafts or balance shaft pairs are generally known. Known balance shaft units which withstand the high loads and nevertheless reliably compensate the mass forces and mass torques which occur are, however, undesirably complex and/or expensive in installation. This in particular applies to balance shaft units which have a housing part with at least one bearing section, which is closed in the peripheral direction and is made in one piece, for the journaling of the balance shaft in the housing. The one-piece design of the bearing section of the housing part admittedly provides good stability of such a balance shaft unit; however, the installation of the balance shaft in the housing is complex and/or expensive. Similar problems result with comparable assemblies which can also be used outside the automotive sector, i.e. very generally with assemblies which have a housing part with at least one bearing section closed in the peripheral direction and made in one piece and at least one rotating component which is journaled in the bearing section.

SUMMARY

It is therefore an object of the invention to provide a method for the installation of an assembly having a rotating component which can be carried out in a simple manner and which simultaneously ensures a reliable journaling of the rotating component. It is furthermore the object of the present invention to provide a corresponding assembly.

The method in accordance with the invention for the installation of an assembly, in particular of a balance shaft unit for the compensation of mass or torque for internal combustion engines in motor vehicles, relates to embodiments having a housing part with at least one bearing section, at least one rotating component and at least one rolling element bearing for the axially fixed journaling of the rotating component in the bearing section of the housing part. The bearing section of the housing part is closed in the peripheral direction and is made in one piece. The rolling element bearing has a first ring section and a second ring section, with the first ring section being associated with the rotating component and the second ring section being associated with the housing part. The rolling element bearing is axially fixedly installed at the rotating component or in the housing part in a first installation step. The rotating component is cooled and/or the housing part is heated in a second installation step. In a third installation step, the rotating component is introduced into the bearing section of the housing part and is held there until a temperature compensation has taken place between the balance shaft and the housing part such that a shrink-fit connection is established between the rotating component and the first ring section of the rolling element bearing or between the second ring section of the rolling element bearing and the bearing section of the housing part.

The method in accordance with the invention thus simplifies the reliable and simple installation of an assembly having a rotating component—for example a shaft—and at least one bearing section closed in the peripheral direction and in one piece. The rotating component is journaled in the one-piece bearing section, with at least one rolling element bearing being provided which ensures an axially fixed journaling of the rotating component.

The above-named rolling element bearing includes at least one first ring section and one second ring section, for instance an inner bearing ring and an outer bearing ring. The first ring section of the rolling element bearing is associated with the rotating component, whereas the second ring section of the rolling element bearing is associated with the bearing section of the housing part. The rolling element bearing serves as a radial bearing and is simultaneously able to take up the axial forces acting on the installed rotating component (fixed bearing seat design).

The installation of the assembly includes at least three installation steps. The first installation step relates to the rolling element bearing which is installed axially fixedly at the rotating component or in the bearing section of the housing part. Subsequently, the rotating component is cooled and/or the housing part—and thus also the bearing section—is heated. The (cooled) rotating component is then introduced into the (heated) bearing section of the housing part until a correct positioning of the rotating component in the housing part is reached. The rotating component is held in this position until the rotating component and the housing part have been heated or cooled respectively to a common temperature. In the course of these temperature changes, the rotating component expands and/or the housing part shrinks. The previously present tolerances between the rotating component and the bearing section of the housing part which have made possible the introduction of the rotating component then disappear and a shrink-fit connection is established between the rotating component and the bearing section of the housing part which ensures a reliable and exact fixing of the rotating component in the bearing section of the housing part.

The installation thus comprises—in simple terms—an installation step for the arrangement of the rolling element bearing—first installation step—which is followed by a step preparing the actual introduction of the rotating component—second installation step—which includes a thermal treatment of the rotating component and/or of the housing part—cooling or heating respectively. The rotating component is then introduced into the housing part or into its bearing section and is held there until a shrink-fit connection is established between the components by the temperature harmonization and the material expansions and contractions associated therewith—third installation step.

In other words, at least two connections are necessary for the installation of the rotating component in the peripherally closed and one-piece bearing section, with the connection second in the time manufacture sequence being made as a shrink-fit connection. If the rolling element bearing is fastened to the rotating component in the first installation step, a shrink-fit connection is subsequently established between the bearing section and the rolling element bearing. The situation is analog in the reverse case.

The method in accordance with the invention is simple to realize and allows a fast and cost-effective installation of an assembly of the named kind. The method can in particular be used for the installation of balance shaft units having at least one axially fixedly arranged rolling element bearing and thus a rolling element bearing acting as a fixed bearing. Complex apparatus for the carrying out of the installation are not necessary.

In accordance with a further development of the method in accordance with the invention, the first installation step includes a shrinking process between the first ring section of the rolling element bearing and the rotating component or between the bearing section of the housing part and the second ring section of the rolling element bearing.

As already described above, the first installation step can include an axially fixed installation of the rolling element bearing either to the rotating component (first embodiment) or in the bearing section of the housing part (second embodiment). In the named further development, this installation step is realized by a shrinking process which ensures a reliable connection of the corresponding components—rolling element bearing/rotating component or rolling element bearing/bearing section.

Alternatively, the rolling element bearing can be installed axially fixedly—in particular in an axially shape matched manner—using a fixing means in the first installation step at the rotating component (first embodiment) or in the bearing section of the housing part (second embodiment) in an axially fixed manner—in particular axially shape matched manner. Such a fixing means can, for example, be a securing ring which is inserted into a corresponding groove of the rotating component or of the housing part. A fastenable bearing cover can also satisfy the function of a fixing means. An adhesive connection, a longitudinal pressing connection or similar can generally also be provided.

In accordance with an advantageous embodiment, it is also possible that the first ring section of the rolling element bearing is made integrally at the rotating component and has a ring groove of the rotating component to which the rolling element bearing is installed in the first installation step. Conversely, it is also possible that the second ring section of the rolling element bearing is made integrally at the bearing section of the housing part and has a ring groove of the bearing section to which the rolling element bearing is installed in the first installation step. In both cases, a reduced number of required components results.

In the second installation step, in the case of the aforesaid first embodiment, the rotating component can be cooled together with the rolling element bearing installed at the rotating component or, in the case of the aforesaid second embodiment, the housing part can be heated together with the rolling element bearing installed in the bearing section of the housing part. This procedure facilitates the introduction of the rotating component and the establishment of a shrink-fit connection.

If the component is a balance shaft unit with a balance shaft as the rotating component, it is preferred if a balance weight associated with the balance shaft is positioned in the housing part in the third installation step and the balance shaft is introduced into an opening of the balance weight, with a shrink-fit connection also be established between the balance weight and the balance shaft. The balance weight is in particular heated for this purpose in a second installation step before the positioning in the housing part or is heated together with the housing part after the positioning in the housing part. The named third installation step therefore hereby simultaneously serves for the fastening of the balance weight to the respective shaft.

The present invention furthermore relates to an assembly, in particular to an assembly for the compensation of mass or torque for internal combustion engines in motor vehicles, which includes a housing part having at least one bearing section closed in the peripheral direction and in one piece, at least one rotating component and at least one rolling element bearing for the axial fixedly journaling of the rotating component in the bearing section of the housing part. The rolling element bearing has—as already described above—a first ring section and a second ring section, with the first ring section being connected to the rotating component and the second ring section being connected to the bearing section of the housing part. The connection of the first ring section to the rotating component and/or the connection of the second ring section to the bearing section of the housing part is a shrink-fit connection.

The connection of the first ring section to the rotating component or the connection of the second ring section to the bearing section of the housing part can include at least one fixing means which fixes the first ring section axially fixedly—in particular in an axially shape matched manner—to the rotating component or which fixes the second ring section axially fixedly—in particular in an axially shape matched manner—to the bearing section of the housing part.

The connection of the first ring section to the rotating component or the connection of the second ring section to the housing part can also be an adhesive connection and/or a longitudinal press connection, with a fixing means being able to be additionally provided under certain circumstances.

In accordance with the above-described further developments of the assembly, there is thus a shrink-fit connection and a different type of connection between the bearing section, the rolling element bearing and the rotating component. It is generally possible that both connections, i.e. the connection of the first ring section to the rotating component and the connection of the second ring section to the bearing section of the housing part, are shrink-fit connections.

It is furthermore possible that the first ring section of the rolling element bearing is formed by a ring groove which is formed at the rotating component. Alternatively, the second ring section of the rolling element bearing is formed by a ring groove which is formed at the bearing section of the housing part. The installation of the rolling element bearing in this case includes the rotatable fastening of the second ring section to the rotating component or the rotatable fastening of the first ring section to the bearing section of the housing part.

Further areas of applicability will become apparent from the description provided herein. The description and specific examples in this summary section are intended only for purpose of illustration and are not intended to limit the scope of the present disclosure.

DRAWINGS

The drawings described herein are for illustrative purposes only of the selected embodiments and not all implementations have been described such that the drawings are not intended to limit the scope of the present disclosure.

DETAILED DESCRIPTION

Figure 1:
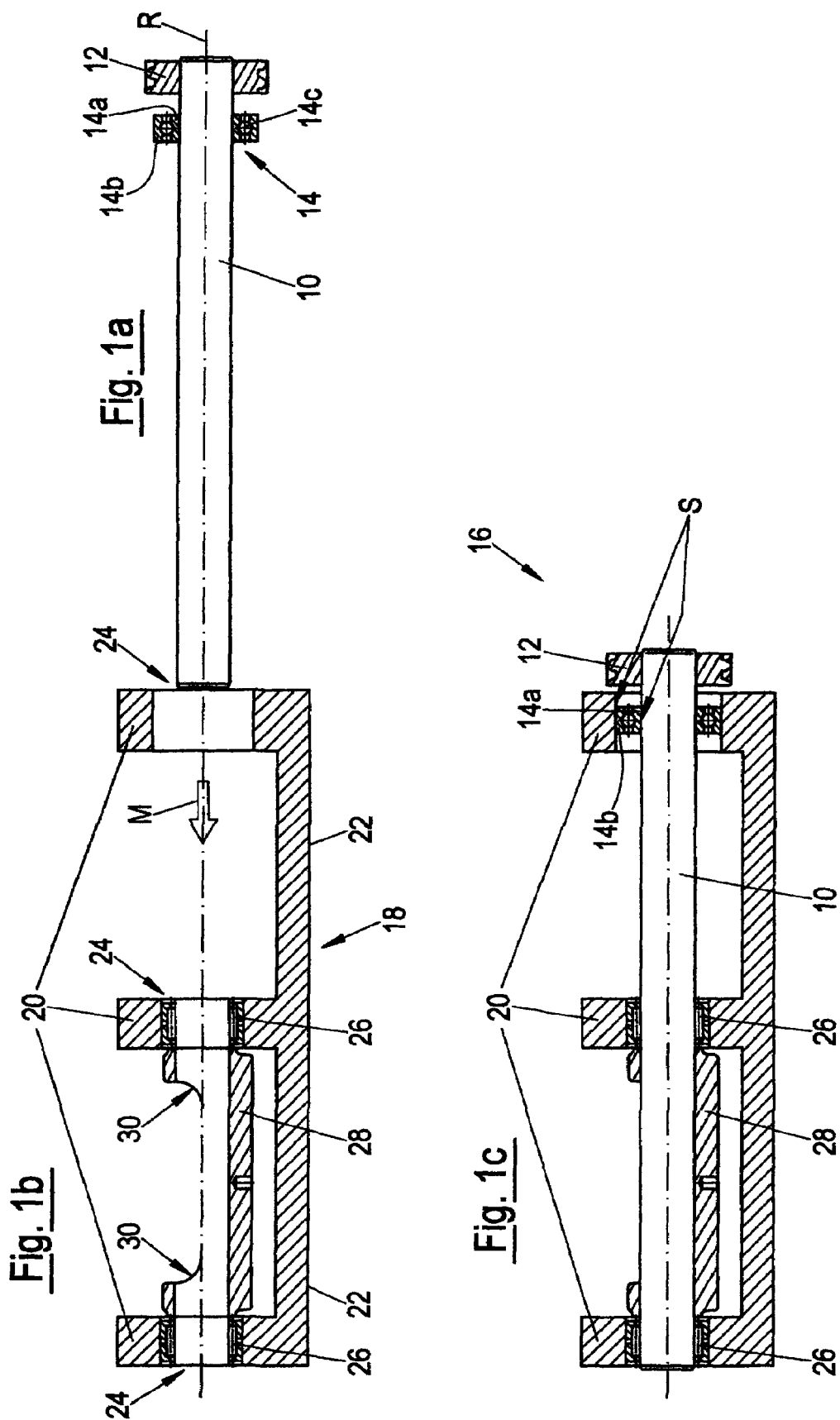
FIGS. 1a-1c are schematic representations of the components of a first embodiment of a balance shaft unit in accordance with the invention in a pre-installed state and an installed state.

FIG. 1a shows a balance shaft 10 at which a drive gear 12 as well as a rolling element bearing 14 are installed. The drive gear 12 serves for the drive of the balance shaft 10 during the operation of an engine of a vehicle. It is, for example, in drive-operative connection with a crankshaft of the engine.

The rolling element bearing 14 includes an inner bearing ring 14a and an outer bearing ring 14b. Balls 14c are arranged between the bearing rings 14a, 14b, whereby the rolling element bearing 14 is made as a ball bearing. The inner bearing ring 14a is rotationally fixedly connected to the balance shaft 10. In the embodiment shown, the rolling element bearing 14 is connected to the balance shaft 10 by a shrink fit. The rolling element bearing 14 can generally also be connected to the balance shaft 10 by adhesive bonding, longitudinal pressing and/or other known fixing means.

The balance shaft 10, with the drive gear 12 installed thereon and with the rolling element bearing 14, forms a pre-installed component of a balance shaft unit 16 whose installed state is shown in FIG. 1c. This state will be described in detail in the following.

FIG. 1b shows further components of the balance shaft unit 16. A balance shaft housing 18—also briefly called a housing 18—is shown schematically to have three bearing sections 20 which are connected to one another by connection sections 22. Openings 24 are provided in the bearing sections 20 and serve for the reception of the pre-installed balance shaft 10 as well as of the components journaling it. The openings 24 are, for example, bores in the bearing sections 20. To ensure the required stability, the bearing sections 20 and the connection sections 22 are made from a single component, with the installation of the balance shaft 10 shown in FIG. 1a taking place by an axial introduction along a rotational axis R of the balance shaft 10.

To prepare for installation of the balance shaft 10 in the housing 18, needle bearings 26 are arranged in the left and middle openings 24 for the reception and journaling of the balance shaft 10. Generally, slide bearings can also be provided instead of the needle bearings 26. In addition, a balance weight 28 is arranged in a region between the left and the middle bearing sections 20 such that its reception bore 30 is flush with the openings 24.

The needle bearings 26 are not designed for the taking up of forces occurring during the operation of the balance shaft unit 16 which act on the balance shaft 10 in the axial direction, i.e. parallel to the axis of rotation R. The axial fixing of the balance shaft 10 in the housing 18 takes place in an installed state of the balance shaft unit 16 by the rolling element bearing 14 which—as already described—is axially fixedly fixed to the balance shaft 10, for instance by a shrink fit.

In preparation for the introduction of the balance shaft 10 of FIG. 1a into the housing 18 of FIG. 1b, the balance shaft 10 is cooled so that its outer dimensions reduces slightly. In addition, the rolling element bearing 14 is also cooled so that it can be introduced into the opening 24 of the right bearing section 20 associated with it. To facilitate the introduction, the housing 18 as well as the needle bearings 26 and the balance weight 28 are heated so that the inner diameters of the openings 24 of the housing 18, the inner diameters of the needle bearings 26 and the inner diameter of the receiving bore 30 of the balance weight 28 are somewhat enlarged. Subsequently the pre-installed balance shaft 10 is introduced into the housing 18 or into the need bearings 26 and the receiving bore 30 without any force application, or with only a small force application, along an installation movement M—symbolized by an arrow.

If the balance shaft 10 already shrinks sufficiently due to the cooling, the heating of the housing 18 can be dispensed with. Alternatively, the cooling of the balance shat 10 can be dispensed with if a heating of the housing 18 is sufficient to generate the tolerances required for the introduction.

The final position of the balance shaft 10 is shown in FIG. 1c. The balance shaft 10 is now journaled in the interior of the openings 24 of the left and middle bearing sections 20 by the needle bearings 26. In addition, the balance shaft 10 extends through the receiving bore 30 of the balance weight 28. The rolling element bearing 14 pre-installed at a suitable point of the balance shaft 10 comes to lie in the interior of the opening 24 of the right bearing section 20.

If the temperature of the components of the pre-installed balance shaft 10 shown in FIG. 1a and the temperature of the components shown in FIG. 1b approximate one another, a shrink connection S is established between the outer bearing ring 14b and the inner surface of the opening 24 of the right bearing section 20. Both the inner bearing ring 14a and the outer bearing ring 14b are thereby rotatably fixedly connected to the component respectively associated with them—the balance shaft 10 or the bearing section 20 of the housing 18—in a reliable manner by shrink connections S. Since the rolling element bearing 14 is able to take up axial forces, the balance shaft 10 is axially fixedly fixed in the housing 18. The journaling of the balance shaft 10 in the rolling element bearing 14 and in the needle bearings 26 allows a low-friction and low-wear journaling which has an advantageous effect on the performance features of the balance shaft unit 16.

It must be noted that the balance weight 28 in the embodiment shown is likewise fastened to the balance shaft 10 by a shrink-fit connection. It is, however, also possible to fix the balance weight 28 to the balance shaft 10 in other manners, for example by screwing, welding or adhesive bonding.

Figure 2:
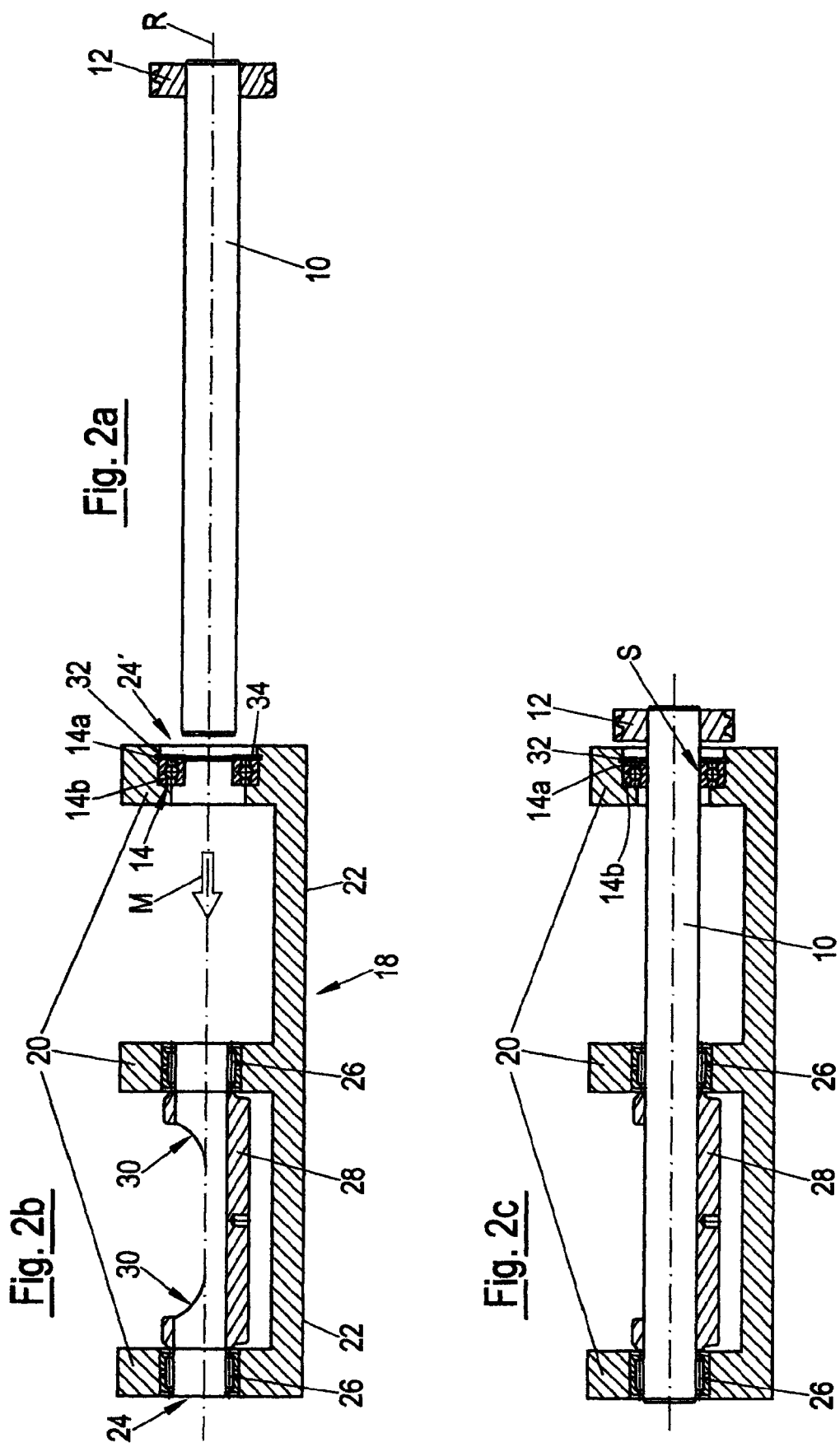
FIGS. 2a-2c are corresponding representations of a second embodiment of the balance shaft unit in accordance with the invention.

FIGS. 2a to 2c show a second embodiment of the balance shaft unit 16 in a pre-installed state and an installed state respectively.

The pre-installed balance shaft 10 shown in FIG. 2a is not provided with a rolling element bearing 14, but rather only has the drive gear 12. In contrast to the first embodiment described above with reference to FIGS. 1a to 1c, the rolling element bearing 14 is arranged in the pre-installed state in a modified opening 24' of the right bearing section 20 of the housing 18. The opening 24' is formed by a stepped bore which has a shoulder supporting the rolling element bearing 14 toward the left. The rolling element bearing 14 is secured to the right in the axial direction by a securing ring 32 which is arranged in a groove 34. The rolling element bearing 14 is thereby secured against displacement in the direction of the axis of rotation R. A rotationally fixed connection of the outer bearing ring 14b to the housing 18 can in this respect—if necessary—be achieved by other/additional measures.

The rolling element bearing 14 can generally also be fixed by adhesive bonding or longitudinal pressing in the opening 24' of the bearing section 20. Instead of the securing ring 32 and the groove 34, a bearing cover or a different fixing element (not shown) can be provided which is fastened—for example screwed—to the bearing section 20 and also fixes the rolling element bearing 14 in the axial direction and optionally also rotationally fixedly.

Analog to the procedure described in FIGS. 1a to 1c, the components connected to the housing 18 or the components associated with it, including the rolling element bearing 14, are also heated here for the installation of the balance shaft 10 to be able to receive the balance shaft 10. The finally installed state of the balance shaft unit 16 is shown in FIG. 2c. The rolling element bearing 14 has only one single shrink-fit connection S to the balance shaft 10, but not to the housing 18.

It is generally also possible to fasten the rolling element bearing 14 axially fixedly to the balance shaft 10 by fixing means, in deviation from the embodiment shown in FIG. 1a. It is only important that at least one of the connections of the rolling element bearing 14 to the balance shaft 10 or to the housing 18 is a shrink-fit connection. This facilitates the installation and results in cost-savings, with no losses in quality of the balance shaft units installed in this way being noted. The method in accordance with the invention and the balance shaft unit manufactured hereby are rather characterized by high reliability.

Figure 3:
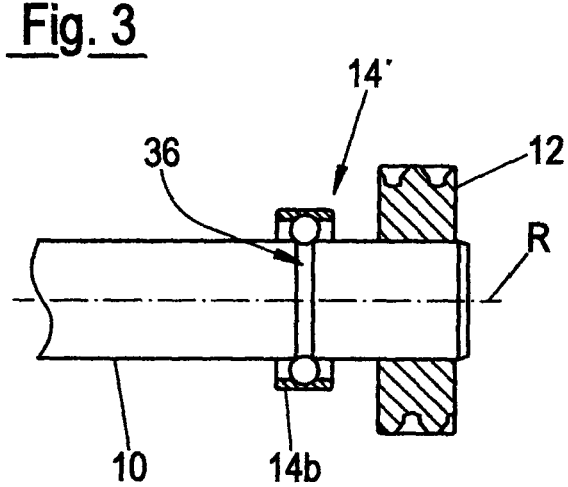
FIG. 3 is an alternative embodiment of a rolling element bearing.

FIG. 3 shows a rolling element bearing 14' which differs from the above-described rolling element bearing 14 in that no separate inner bearing ring 14a is provided. Instead, it is formed by a section of the balance shaft 10 which has an (outer) ring groove 36. The installation of the rolling element bearing 14' takes place in a conventional manner, i.e. the balls 14c are arranged on one side concentrated in the interior of the outer bearing ring 14b for the preparation of the rolling element bearing installation. The outer bearing ring 14b is then pushed, together with the balls 14c, eccentrically over the balance shaft 10 until the position of the ring groove 36 is reached. The balls 14c are there distributed evenly in the peripheral direction and are fixed in their position by a cage, not shown. The rolling element bearing 14' is characterized by the reduced number of components as well as by a simple installation and high reliability. In this embodiment of the rolling element bearing 14', a shrink connection S is established between the bearing section 20 of the housing 18 and the outer bearing ring 14b of the rolling element bearing 14' installed at the balance shaft 10, as described in connection with FIGS. 1a to 1c.

Analog to the embodiment in accordance with FIG. 3, it is also possible that the rolling element bearing is made without a separate outer bearing ring 14b, but it is rather formed by the bearing section 20 of the housing 18 which has an (inner) ring groove for the roller body. The rolling element bearing is therefore installed in this case in that the roller body (balls 14c), a cage and the bearing inner rig 14a are fastened to the bearing section 20 of the housing 18 while utilizing the ring groove. Subsequently, a shrink connection S can be established between the inner bearing ring 14a and the balance shaft 10, as described in connection with FIGS. 2a to 2c.

The present invention has admittedly only been described with reference to a balance shaft unit. The concept in accordance with the invention can, however, also be applied to other assemblies which include a housing part having at least one peripherally closed and one-piece bearing section—that is not, for instance, two bearing shells to be connected to one another or similar.

The forgoing description of the embodiments has been provided for purposes of illustration and description. It is not intended to be exhaustive or to limit the invention. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

REFERENCE NUMERAL LIST 10 balance shaft
12 drive gear
14' rolling element bearing
14a inner bearing ring
14b outer bearing ring
14c ball
16 balance shaft unit
18 balance shaft housing
20 bearing section
22 connection section
24, 24' opening
26 needle bearing
28 balance weight
30 receiving bore
32 securing ring
34 groove
36 ring groove
R axis of rotation
M installation movement
S shrink connection

The invention claimed is:

1. A method for assembling a balance shaft unit for use with internal combustion engines in motor vehicles, the method comprising the steps of:
providing a plurality of components associated with the balance shaft unit, the components including a housing part having a connection section and at least one bearing section extending outwardly from the connection section and having an opening, at least one rotating balance shaft, a drive gear, and at least one rolling element bearing for the axially fixed journaling of the balance shaft in the opening in the bearing section of the housing part, wherein the drive gear is fixed to one end of the balance shaft and is adapted to be driven by a rotary member of the internal combustion engine, wherein the bearing section of the housing part is closed in the peripheral direction and is made in one piece, wherein the rolling element bearing has a first ring section and a second ring section, wherein the first ring section is associated with the balance shaft and the second ring section is associated with the bearing section of the housing part;
axially fixedly installing the rolling element bearing at the balance shaft or in the bearing section;
cooling the balance shaft and/or heating the bearing section of the housing part; and
introducing the balance shaft into the opening in the bearing section of the housing part and which is held there until a temperature compensation has taken place between the balance shaft and the housing part such that a shrink-fit connection (S) is established between the balance shaft and the first ring section of the rolling element bearing or between the second ring section of the rolling element bearing and the bearing section of the housing part.

2. The method in accordance with claim 1, wherein the step of axially fixedly installing the rolling element bearing includes a thermal shrinking process between the first ring section of the rolling element bearing and the balance shaft or between the bearing section of the housing part and the second ring section of the rolling element bearing.

3. The method in accordance with claim 1, wherein the rolling element bearing is axially fixedly installed at the balance shaft or in the bearing section of the housing part using a fixing means, an adhesive bonding process and/or by a longitudinal pressing connection.

4. The method in accordance with claim 1, wherein the first ring section of the rolling element bearing is made integrally at the balance shaft and has a ring groove formed in the balance shaft, with the rolling element bearing being installed at the ring groove of the balance shaft.

5. The method in accordance with claim 1, wherein the balance shaft is cooled together with the rolling element bearing installed on the balance shaft or the housing part is heated together with the rolling element bearing installed in the opening in the bearing section of the housing part.

6. The method in accordance with claim 1, wherein the balance shaft has at least one balance weight, wherein prior to the step of introducing the balance shaft, the balance weight is positioned in the housing part and after the balance shaft is introduced into the opening in the bearing section the balance weight is introduced into an opening of the balance weight, and wherein a shrink-fit connection also being established between the balance weight and the balance shaft.

7. The method in accordance with claim 6, wherein the balance weight is heated before the positioning in the housing part or is heated together with the housing part after the positioning in the housing part.

8. The method in accordance with claim 1 wherein the second ring section of the rolling element bearing is made integrally at the bearing section of the housing and includes a ring groove in the bearing section such that the rolling element bearing is installed at the ring groove in the bearing section.

9. The method for assembling a balance shaft unit for use in a motor vehicle, the method comprising the steps of:
providing a plurality of components associated with the balance shaft unit including a housing having a first bearing section with a first opening, a second bearing section with a second opening and a connection section interconnecting the first and second bearing sections, a balance shaft, a drive gear, a first bearing, and a second bearing defining a rolling element bearing having an inner ring section and an outer ring section;
fixing the drive gear to a first end of the balance shaft;
fixing the first bearing in the first opening in the first bearing section;
fixing the inner ring section to an outer surface of the balance shaft for axially locating the rolling element bearing on the balance shaft;
cooling the balance shaft and the rolling element bearing;
introducing a second end of the cooled balance shaft through the first and second openings in the first and second bearing sections of the housing for locating a portion of the balance shaft in the first bearing and for locating the rolling element bearing in the second opening of the second bearing section; and
subsequently holding the balance shaft relative to the housing until a temperature compensation therebetween establishes a shrink-fit connection between the first bearing and the portion of the balance shaft and between the outer ring section of the rolling element bearing and the second bearing section of the housing such that the shrink-fit connection functions to axially locate and retain the balance shaft relative to the housing.

10. The method of claim 9 further comprising the step of heating the housing prior to introduction of the balance shaft through the first and second openings in the first and second bearing sections.

11. The method of claim 9 wherein the inner ring section of the rolling element bearing is fixed to an outer surface of the balance shaft via a thermal shrinking process to establish a shrink-fit connection therebetween.

12. The method of claim 9 wherein the first ring section is formed integrally with the balance shaft and includes a ring groove in an outer surface of the balance shaft that is adapted to receive a plurality of roller elements associated with the rolling element bearing.

13. The method of claim 9 further including the step of locating a balance weight between the first and second bearing sections of the housing which has a balance weight opening that is aligned with the first and second openings in the first and second bearing sections such that a shrink-fit connection is established between the balance shaft and the balance weight following a temperature compensation therebetween.

14. The method of claim 13 further comprising the step of heating the housing and the balance weight prior to introduction of the balance shaft through the first and second openings in the first and second bearing sections and the balance weight opening in the balance weight.

15. A method for assembling a balance shaft unit for use in a motor vehicle having an internal combustion engine, the method comprising the steps of:
providing a plurality of components associated with the balance shaft unit including a housing having a first bearing section with a first opening, a second bearing section with a second opening and a connection section interconnecting the first and second bearing sections, a balance shaft, a drive gear, and a rolling element bearing having an inner ring section and an outer ring section;
fixing the inner ring section to an outer surface of the balance shaft for axially locating the rolling element bearing on the balance shaft;
fixing the drive gear to one end of the balance shaft, the drive gear adapted to be driven by a rotary member of the internal combustion engine;
heating the housing; and
introducing a second end of the balance shaft through the first and second openings in the first and second bearing sections of the housing for locating the rolling element bearing in the second opening of the second bearing section and subsequently holding the balance shaft relative to the housing until a temperature compensation therebetween establishes a shrink-fit connection between the outer ring section of the rolling element bearing and the second bearing section of the housing such that the shrink-fit connection functions to axially locate and retain the balance shaft relative to the housing.

16. The method of claim 15 further comprising the step of cooling the balance shaft prior to introduction of the balance shaft through the first and second openings in the first and second bearing sections.

17. The method of claim 15 wherein the inner ring section of the rolling element bearing is fixed to the outer surface of the balance shaft via a thermal shrinking process to establish a shrink-fit connection therebetween.

18. The method of claim 15 wherein the first ring section is formed integrally with the balance shaft and includes a ring groove in the outer surface of the balance shaft that is adapted to receive a plurality of roller elements associated with the rolling element bearing.

19. The method of claim 15 further including the step of locating a balance weight between the first and second bearing sections of the housing which has a balance weight opening that is aligned with the first and second openings in the first and second bearing sections such that a shrink-fit connection is established between the balance shaft and the balance weight following a temperature compensation therebetween.

20. The method of claim 19 further comprising the step of heating the balance weight prior to introduction of the balance shaft through the first and second openings in the first and second bearing sections and the balance weight opening in the balance weight.

21. A method for assembling a balance shaft unit for use in a motor vehicle having an internal combustion engine, the method comprising the steps of:
providing a plurality of components associated with the balance shaft unit including a housing having first and second bearing sections extending outwardly from a connection section and respectively defining first and second openings, a balance shaft, a drive gear fixed to one end of the balance shaft and adapted to be driven by a rotary member of the internal combustion engine, and a rolling element bearing having an inner ring section and an outer ring section;
fixing the outer ring section in the second opening for axially locating the rolling element bearing relative to the housing;
cooling the balance shaft and/or heating the housing; and
introducing a second end of the balance shaft through the first and second openings in the first and second bearing sections and holding the balance shaft in this position until a temperature compensation therebetween establishes a shrink-fit connection between the inner ring section of the rolling element bearing and the balance shaft such that the shrink-fit connection functions to axially locate and retain the balance shaft relative to the housing.

22. The method of claim 21 further including the step of locating a balance weight between the first and second bearing sections of the housing which has a balance weight opening aligned with the first and second openings in the first and second bearing sections such that a shrink-fit connection is established between the balance shaft and the balance weight following a temperature compensation therebetween.

23. The method of claim 22 further comprising the step of heating the balance weight prior to introduction of the balance shaft through the opening in the balance weight.

24. The method of claim 1 further including the step of mounting the balance shaft unit to the internal combustion engine such that the drive gear causes the balance shaft to be driven by the rotary member of the internal combustion engine.

25. The method of claim 9 further including the step of mounting the balance shaft unit to the internal combustion engine such that the drive gear causes the balance shaft to be driven by the rotary member of the internal combustion engine.

26. The method of claim 15 further including the step of mounting the balance shaft unit to the internal combustion engine such that the drive gear causes the balance shaft to be driven by the rotary member of the internal combustion engine.

27. The method of claim 21 further including the step of mounting the balance shaft unit to the internal combustion engine such that the drive gear causes the balance shaft to be driven by the rotary member of the internal combustion engine.

28. A method for assembling a balance shaft unit for use in a motor vehicle having an internal combustion engine, the method comprising the steps of:
providing a plurality of components associated with the balance shaft unit, the components including a housing, a balance shaft, a roller bearing unit and first and second needle bearing units, the housing being a one-piece housing having first, second and third bearing sections extending outwardly from a common connector section and respectively defining first, second and third openings, the roller bearing unit having an inner ring section and an outer ring section;
fixing the first needle bearing unit in the first opening in the first bearing section;
fixing the second needle bearing unit in the second opening in the second bearing section;
fixing the roller bearing unit in the third opening in the third bearing section;
cooling the balance shaft and/or heating the housing;
inserting the balance shaft through the first and second needle bearing units and the inner ring of the roller bearing unit; and
holding the balance shaft in this inserted position until a temperature compensation between the heated and/or cooled components establishes a first shrink-fit connection between a first portion of the balance shaft and the first needle bearing unit, a second shrink-fit connection between a second portion of the balance shaft and the second needle bearing unit, and a third shrink-fit connection between a third portion of the balance shaft and the inner ring of the roller bearing unit, wherein at least the roller bearing unit functions to axially locate and retain the balance shaft relative to the housing.

* * * * *